May 13, 1958  G. A. LYON  2,834,637
WHEEL COVER
Filed Feb. 18, 1954
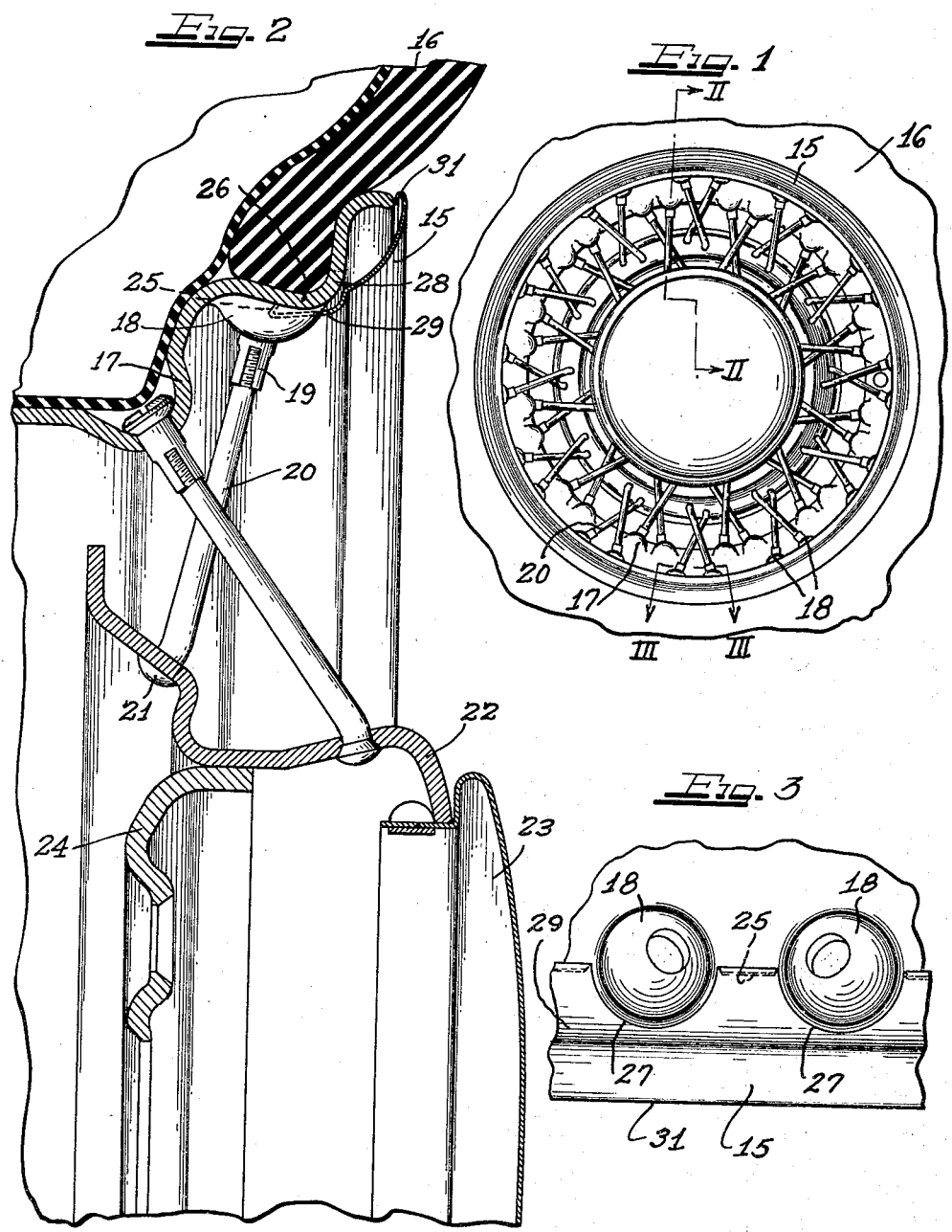
Inventor
GEORGE ALBERT LYON

United States Patent Office 2,834,637
Patented May 13, 1958

2,834,637

WHEEL COVER

George Albert Lyon, Detroit, Mich.

Application February 18, 1954, Serial No. 411,150

2 Claims. (Cl. 301—37)

This invention relates to ornamental trim rings, and more particularly to a combination trim ring and wheel structure.

An object of this invention is to provide an improved trim ring structure capable of fitting over and firmly affixing itself to the outer periphery of the tire rim.

Another object of this invention is to provide a novel trim ring which lends itself to economical manufacture on a large production scale.

A further object of this invention is to provide a novel trim ring structure with hidden gripping means so as not to upset the ornamental symmetry of the ring and wheel in assembled relationship.

Another object of the invention is to provide a circular trim member for a wire spoked wheel and having alternate wire spoke terminal receiving notches and retaining fingers whereby the notches can operate with the wheel spoke terminals in resisting turning of the trim ring on the wheel.

In accordance with the general features of this invention, there is provided in a wheel structure having a multi-flanged tire rim including a stepped terminal flange and a plurality of wire spokes terminating in boss portions positioned on the terminal flange, an annular trim member or ring of curved configuration to fit over and conceal the outer periphery of the terminal flange, the ring having an axially inner margin notched out to receive the complementary wire spoke boss or terminal portions on the stepped flange and provided with short angled underturned fingers for concealed gripping engagement with the outer periphery of the stepped flange between the boss portions on the flange.

Other objects and features of this invention will more fully appear from the following detailed description taken in connection with the accompanying drawing which illustrates a single embodiment thereof and in which:

Figure 1 is a fragmentary side view of a spoked wire wheel having a novel ornamental trim member or ring firmly positioned on the outer periphery of the tire rim;

Figure 2 is an enlarged fragmentary cross sectional side elevational view taken along the line II—II of Figure 1 and showing the novel trim ring as having short stiff fingers for retention on the tire rim; and Figure 3 is a fragmentary detail view taken on the line III—III of Figure 1 and showing the novel trim ring notched out to receive the complementary spoke boss portions on the tire rim but with the spokes omitted.

As shown on the drawings:

My novel trim ring, which is designated generally by the reference character 15, is adapted for use with a conventional wire spoke automobile wheel. Such a wheel includes the usual pneumatic tire and tube assembly 16 carried in a customary way upon the flanges of a multi-flanged type tire rim 17. Such a tire rim 17 has disposed about its inner margin a plurality of apertured wire spoke bosses or terminals 18. Each of these bosses 18 is capable of receiving a threaded detachable head portion 19 of a wheel spoke 20 which is secured at its other end by means of a stud or head 21 positioned on the radially inner side of an apertured wheel hub member 22.

Attached in the usual manner to the hub member 22 is a conventional snap-on hub cap 23. Positioned directly opposite hub cap 23 and spaced therefrom is a bolt-on flange 24 which is affixed on the hub member 22. Such a bolt-on flange 24 is adapted to be bolted on the wheel support (not shown).

The trim ring 15 is of such dished convex construction that it may be economically manufactured on a large production scale from a stamping or rolled blank which may be made from any suitable metallic sheet such as steel strip, although excellent results are attainable by rolling it from thin stainless steel stock.

The trim ring 15, which is provided in accordance with the features of this invention, is curvingly constructed to conceal substantially unsightly irregularities along the outer periphery of the terminal flange or tire rim 17 and particularly the junction of the trim ring 15 and the tire rim 17.

My invention is also concerned with providing relatively short underturned stiff fingers 25 on the trim ring 15 capable of gripping the stepped terminal portion 26 of the tire rim 17. It will be noted from Figures 1 and 2 that such retaining means is completely concealed when the trim is on the wheel.

As best seen in Figure 3, the trim ring 15 is notched out at 27 along its radially inner periphery so as to telescope partially the spaces between the bosses 18 along the outer periphery of the flange 17. The notches 27 alternate with the retaining fingers 25 and the edges of the notches engage around the spoke terminals or bosses 18 to resist turning of the ring relative to the wheel when retained thereon by fingers 25. Also, it will be noted that ring 15 only cooperates with the outermost spoke terminals located on terminal flange 26 and not with those of the alternate inner wire spokes secured to an inner flange of the tire rim.

The trim ring 15 is so constructed as to have a curved surface 29 including fingers 25 to fit closely over the stepped portion 28 of the tire rim 17 when the trim ring is in bottomed position on the tire rim. This curved surface 29, when in tight engagement with the tire rim stepped portion 26, provides a firm base for the gripping fingers 25 and blends symmetrically into the shape of flange portion 26 so as to give the appearance of being integral therewith. In fact, the trim ring 15 does not appear to be added but rather looks as if it was made a part of the tire rim. When given a lustrous finish, it greatly enhances the appearance of the wheel.

The short stiff underturned resilient fingers 25 normally have their terminals of a diameter slightly greater than that of the surface of rim portion 26 engaged thereby so as to be stressed when the ring 15 is pressed axially inward into position on rim 17. They are thus resiliently wedged between the ring proper and the tire rim for holding the ring on the wheel.

The ring 15 may also be pried off of the wheel when desired by inserting a suitable pry-off tool or screwdriver under the reinforced turned outer edge 31 of the ring and by applying a slight twisting force thereto.

In addition, while I have shown my trim member 15 of relatively shallow depth, its width or expanse could be increased without departing from the spirit and intent of my invention.

I claim as my invention:

1. In a wheel structure, a wheel having a stepped tire rim including an outer margin and an intermediate flange extending generally axially inwardly therefrom and having a plurality of circumferentially spaced boss-like spoke terminals thereon, and an annular trim ring section to fit generally over said outer margin and having an axially inner substantially continuous margin notched out to receive and complementary to said boss-like spoke terminals and provided with finger means for gripping engagement with said intermediate flange between said terminals, said notches each being defined by a terminal edge nestingly cooperable with said spoke terminal to resist turning of the ring section on the wheel and providing a rigid back-up for said ring section when engaged against the spoke terminal to resist inward deflection of the ring section.

2. In a wheel structure, a wheel having a multi-flanged tire rim including an outer terminal flange and an intermediate flange extending generally axially inwardly therefrom and having a plurality of circumferentially spaced spoke terminals thereon, and an annular trim ring section for overlying disposition upon said rim terminal flange, said section being provided with a continuous axially inner margin notched out at intervals to nestingly receive and cooperate with said spoke terminals, said trim ring section margin being turned back upon itself between said notches into concealed finger-like wheel gripping extensions to resiliently and detachably retain said ring section on said intermediate flange, each of the ring section notches including a substantially continuous edge bottomly engageable and cooperable with one of said spoke terminals to insure against inward axial displacement of said trim ring section and being closely wrapped around at least a portion of each of said spoke terminals to insure co-rotation of said trim ring section and said wheel.

References Cited in the file of this patent

UNITED STATES PATENTS

| | | |
|---|---|---|
| 1,878,441 | Green | Sept. 20, 1932 |
| 1,920,575 | Lyon | Aug. 1, 1933 |
| 2,135,757 | Lyon | Nov. 8, 1938 |